United States Patent
Albuz et al.

(10) Patent No.: US 10,755,463 B1
(45) Date of Patent: Aug. 25, 2020

(54) AUDIO-BASED FACE TRACKING AND LIP SYNCING FOR NATURAL FACIAL ANIMATION AND LIP MOVEMENT

(71) Applicant: Facebook Technologies, LLC, Menlo Park, CA (US)

(72) Inventors: Elif Albuz, Los Gatos, CA (US); Bryan Michael Anenberg, Mountain View, CA (US); Colin Lea, Pittsburgh, PA (US); Samuel Alan Johnson, Menlo Park, CA (US); Nikita Shulga, San Jose, CA (US); Xingze He, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/041,628

(22) Filed: Jul. 20, 2018

(51) Int. Cl.
| | |
|---|---|
| *G06T 13/00* | (2011.01) |
| *G06T 13/20* | (2011.01) |
| *G06T 13/40* | (2011.01) |
| *G10L 21/00* | (2013.01) |
| *G10L 13/033* | (2013.01) |
| *G10L 13/04* | (2013.01) |

(52) U.S. Cl.
CPC ............ *G06T 13/205* (2013.01); *G06T 13/40* (2013.01); *G10L 13/0335* (2013.01); *G10L 13/043* (2013.01)

(58) Field of Classification Search
None
See application file for complete search history.

(56) References Cited

U.S. PATENT DOCUMENTS

| | | | | |
|---|---|---|---|---|
| 2006/0204060 A1* | 9/2006 | Huang | ............... | G06K 9/00335 382/118 |
| 2012/0026174 A1* | 2/2012 | McKeon | ............... | G06T 13/205 345/473 |
| 2013/0258040 A1* | 10/2013 | Kaytaz | ................... | H04N 7/157 348/14.07 |
| 2015/0249693 A1* | 9/2015 | Gupta | ................... | G06F 3/0481 715/753 |

\* cited by examiner

*Primary Examiner* — Tize Ma
(74) *Attorney, Agent, or Firm* — Baker Botts L.L.P.

(57) ABSTRACT

In one embodiment, a method includes receiving an audio signal comprising a plurality of speech units, processing the audio signal to associate each of the speech units with a corresponding lip animation, determining pitch information associated with each of the plurality of speech units, processing the pitch information of each of the plurality of speech units to associate at least one of the speech units with a facial-component animation, and presenting the audio signal with a displayed animation of a face, wherein the animation of the face displays the lip animation associated with each of the speech units and the facial-component animation associated with the at least one speech unit. The animation of the face may be displayed in real time with the audio signal. The facial component animation may include animation of the lips, eyebrows, eyelids, and other portion of the upper face.

20 Claims, 11 Drawing Sheets

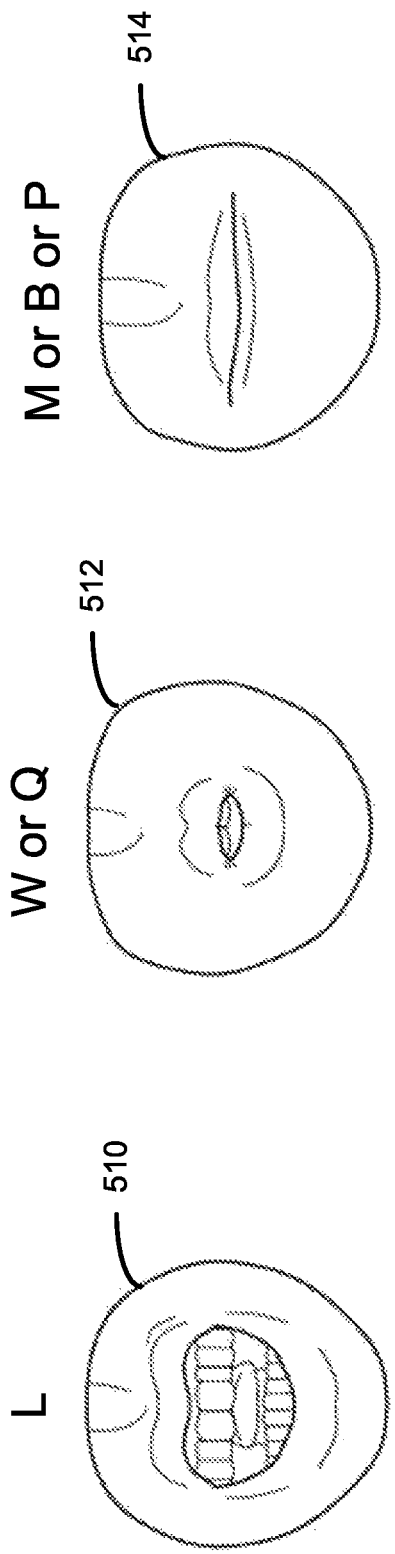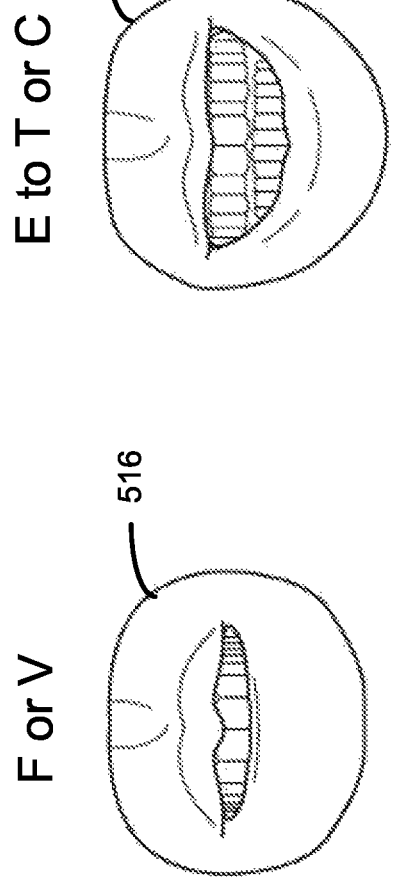

AUDIO-BASED FACE TRACKING AND LIP SYNCING FOR NATURAL FACIAL ANIMATION AND LIP MOVEMENT

TECHNICAL FIELD

This disclosure generally relates to audio-driven facial tracking and animation.

BACKGROUND

In a virtual reality environment, speech recognition may be useful for simulating conversations using artificial intelligence animations with faces replicating the speech of one or more of the users. This can allow users to interact in a seemingly real or physical way within the virtual reality environment and with each other within a computer-generated simulation of the environment (e.g., a three-dimensional environment). A virtual reality system, which may be a single device or a group of devices, may generate this simulation for display to a user, for example, on a virtual reality headset or some other display device. The simulation may include images, sounds, haptic feedback, and/or other sensations to imitate a real or imaginary environment. In addition, virtual reality may be used to simulate and facilitate real-life conversations and other user interactions.

SUMMARY OF PARTICULAR EMBODIMENTS

Embodiments described herein are directed to audio-driven animation models that map audio signals to facial movement models in real time. Currently, animation models such as a generic face showing movement of facial features corresponding to audio (e.g., a representative animation of a person talking in virtual reality) uses phonemes mapped to mouth shapes. In this situation, the mouth shapes are drawn by an artist or animator, and the transition from one mouth shape to another is computer-generated to transition from the first mouth shape to the next mouth shape. However, current animation models tend to result in unrealistic "wooden" faces that look unnatural due to the computer-generated mouth-shape transitions and also the lack of movement in the rest of the face (e.g., eyebrows, cheeks, etc.).

Embodiments described herein include a method for audio-based facial tracking and animation that includes the steps of receiving an audio signal comprising a plurality of speech units, processing the audio signal to associate each of the speech units with a corresponding lip animation, determining pitch information associated with each of the plurality of speech units, processing the pitch information of each of the plurality of speech units to associate at least one of the speech units with a facial-component animation, and presenting the audio signal with a displayed animation of a face, wherein the animation of the face displays the lip animation associated with each of the speech units and the facial-component animation associated with the at least one speech unit.

In particular embodiments, the facial component animation may include animation of a portion of the face other than lips. In particular embodiments, the facial component animation may include animation of eyebrows and eyelids. In particular embodiments, the facial component animation may include movement in eyebrow height, eyebrow movement, and eyelid movement. In particular embodiments, the facial component animation may include animation of the cheeks and upper face. The method may further include processing the audio signal to detect one or more events associated with one or more of the speech units and presenting the audio signal with the animation of the face that displays an event animation corresponding to the one or more speech units. In particular embodiments, the event animation may replace the lip animation and facial component animation associated with the one or more speech units. Moreover, the method may comprise determining an amplitude of the one or more speech units of the audio signal associated with the detected events, wherein movement of the event animation is correlated to the amplitude of the one or more speech units. In particular embodiments, the event animation may include animation illustrative of laughter.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 5A-5J illustrate example lip movement models for audio syncing.

DESCRIPTION OF EXAMPLE EMBODIMENTS

Figure 1:
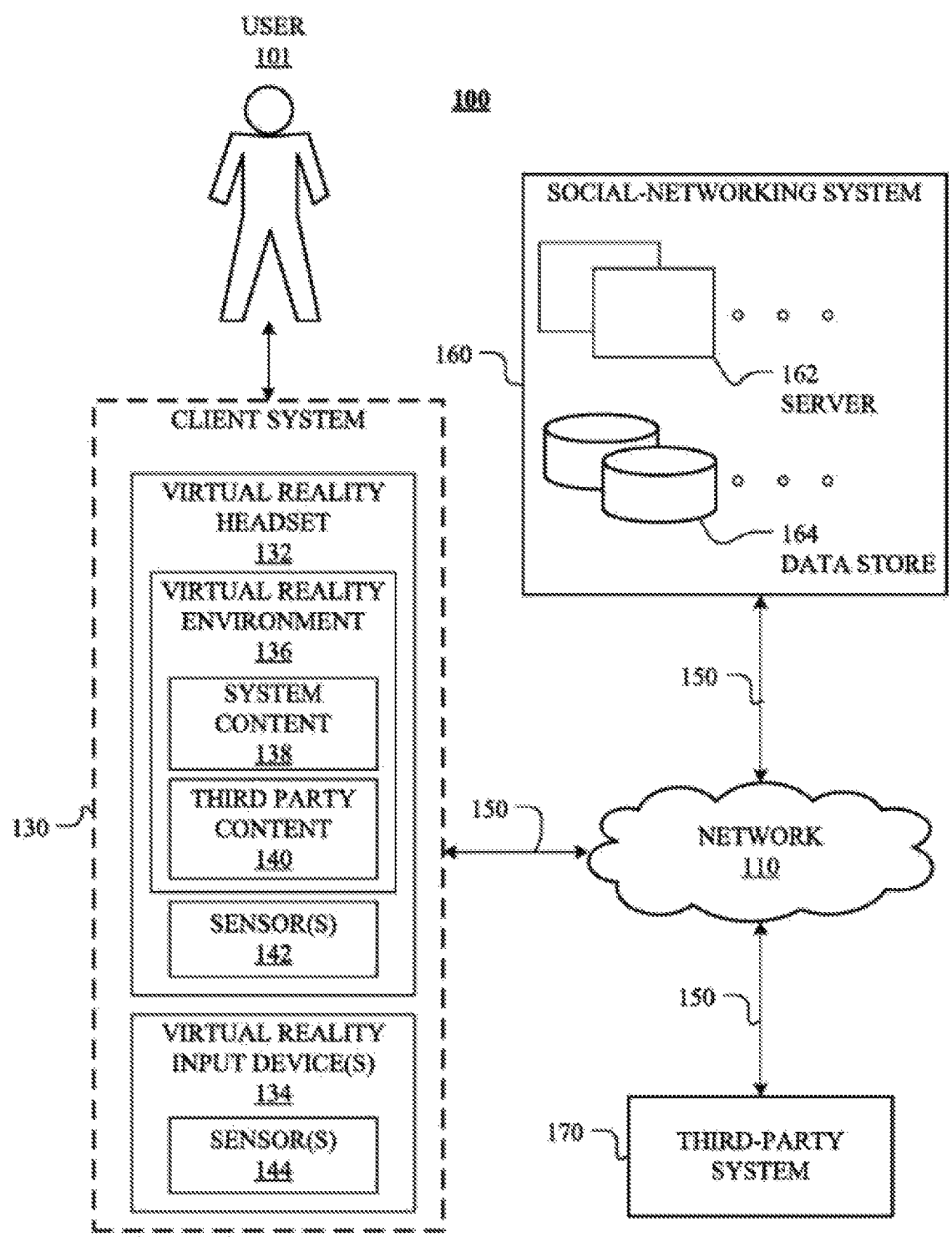
FIG. 1 illustrates an example network environment associated with a virtual reality system.

Particular embodiments described herein are directed to audio-driven animation models that map audio signals to more-realistic looking facial-movement models in real time. Currently, animation models of a generic face may be used to illustrate an animation of a "talking head," which may be used in virtual reality environments, conversation application environments, emoji environments, and other relevant environments. These animation models may be used for illustrating a generic human face showing movement of facial features corresponding to audio to provide a representation of the face modeling lip movement representative of the audio to look as if the animated face was speaking the words and/or sounds of the audio (e.g., a representative animation of a person talking in virtual reality). This generic face may also be an animal face, an avatar face, or any other suitable face of face-shaped model. In translating the audio signals to lip movement, the audio signals may be separated into short audio segments (e.g., 1 millisecond, 5 milliseconds, 10 milliseconds, or other suitable time segment), and each audio segment may be analyzed and associated with a set of phonemes, which are the perceptually distinct units of sound in a particular language that distinguishes one word from another. As an example, there are 44 phonemes associated with the English language; other languages such as the Spanish language is associated with 24 phonemes. These phonemes are mapped to corresponding mouth shapes, which are currently drawn by an artist or animator. Then, these phoneme-mapped mouth shapes selected based on the short audio segments are linked to each other based on their corresponding position within the audio, and the transition from one mouth shape to the next mouth shape is computer generated to smoothly transition from the mouth shape of one audio segment to the mouth shape of the next audio segment. The resulting animation illustrates the face-shaped model moving its lips to appear as if it is speaking the words in the audio. However, current animation models tend to result in unrealistic-looking faces with unnatural mouth movements mimicking the audio due to generic artist-drawn mouth shapes and the computer-generated mouth-shape transitions. In addition, because the human face makes numerous micro-expressions during speech through movement of the eyebrows, eyelids, upper face, checks, and other portions of the face, this animation model results in an animation that looks "wooden" and expressionless while mimicking speech due to the lack of movement in the rest of the face.

The embodiments described below are directed to using an audio-based face tracking solution that maps the lip movement to the phonemes detected in the audio signal. The lip-movement models are determined based on analysis of thousands of hours of tracking lip and facial movements in videos of users speaking in various languages and in various situations. The model processes a variety of face-tracking data to "learn" lip sync movement of the user's mouth while the user is speaking to generate animation models of the movement based on the face-tracking data, and maps phonemes directly from the mouth movement data to the associated animated model. In addition, the non-linear transitions between mouth shapes is also tracked and analyzed to generate a model that can intelligently transition from one mouth shape to the next.

In addition, other information and events in the audio signal may be used to map other facial characteristics to help the animated faces look more realistic. As an example, the pitch of the voice in the audio signal (i.e., the degree of highness or lowness of a tone in the voice that depends on the number of vibrations per second produced by the vocal cords) may be correlated to eyebrow height and movement, and also eyelid and cheek movement. As another example, a laughter event may be detected to animate the face based on a generic animation or tracking and generalizing facial movement based on analysis of videos, as described above. In particular, the laughter animation may depend on the amplitude of the audio to drive the "power" of the laughter, which may then correspond to different animations for different categories of laughter. Additional events such as sighing, crying, and other relevant events may also be tracked and portrayed by the facial animation model.

Computer based facial expression modelling and animation is useful for presenting animated facial expressions on animated human faces, animal faces, avatar and/or character faces, and other suitable face-like animations. As an example and not by way of limitation, the facial expression modelling and animation may be used to create animated faces displayed within a virtual reality system that renders a virtual environment, which may include a virtual space that is rendered for display to one or more users. The users may view and interact with each other within this virtual space and the broader virtual environment through any suitable means, such as using animations of themselves or of their avatars to communicate and interact with each other. As another example and not by way of limitation, the facial expression modelling and animation may be used to create animated faces and/or characters for use in messaging applications and other relevant communications applications. The user may record an audio segment, and the facial expression modelling and animation system may generate an animation of a face (e.g., a human face, an animal face, an avatar face, or any other suitable face) to model the movement of the face and lips based on the audio segment. Although this disclosure describes using the facial expression modelling and animation system in a particular manner, this disclosure contemplates using the facial expression modelling and animation system in any suitable manner.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates an example network environment 100 associated with a virtual reality system. Network environment 100 includes a user 101 interacting with a client system 130, a social-networking system 160, and a third-party system 170 connected to each other by a network 110. Although FIG. 1 illustrates a particular arrangement of a user 101, a client system 130, a social-networking system 160, a third-party system 170, and a network 110, this disclosure contemplates any suitable arrangement of a user 101, a client system 130, a social-networking system 160, a third-party system 170, and a network 110. As an example and not by way of limitation, two or more of a user 101, a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple users 101, client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130. A client system 130 may generate a virtual reality environment for a user to interact with content.

In particular embodiments, a client system 130 may include a virtual reality (or augmented reality) headset 132, such as OCULUS RIFT and the like, and virtual reality input devices 134, such as a microphone and one or more virtual reality controllers. A user at a client system 130 may wear the virtual reality headset 132 and use the virtual reality input devices to interact with a virtual reality environment 136 generated by the virtual reality headset 132. Although not shown, a client system 130 may also include a separate processing computer and/or any other component of a virtual reality system. A virtual reality headset 132 may generate a virtual reality environment 136, which may include system content 138 (including but not limited to the operating system), such as software or firmware updates and also include third-party content 140, such as content from applications or dynamically downloaded from the Internet (e.g., web page content). A virtual reality headset 132 may include sensor(s) 142, such as a microphone to detect and/or record audio signals, and accelerometers, gyroscopes, magnetometers to generate sensor data that tracks the location of the headset device 132. The headset 132 may also include eye trackers for tracking the position of the user's eyes or their viewing directions. The client system may use data from the sensor(s) 142 to detect and record audio signals and determine velocity, orientation, and gravitation forces with respect to the headset. Virtual reality input device(s) 134 may include sensor(s) 144, such as accelerometers, gyroscopes, magnetometers, and touch sensors to generate sensor data that tracks the location of the input device 134 and the positions of the user's fingers. The data collected by the microphone may be processed by client system 130, or sent to network 110 for processing (e.g., may be processed by network 110, social-networking system 160, and/or third-party system 170), Third-party content 140 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser to a particular server (such as server 162, or a server associated with a third-party system 170), and the web browser may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser of a third-party content 140, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160. Social graphs and relationship connections are discussed in more detail below.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, information associated with these content objects may be presented to the user via animated faces created using the facial expression modelling and animation methods described below. These presentation methods may result in more user interest in the content objects and more user interaction and engagement with the content objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system

160 by a third-party through a "communication channel," such as a newsfeed or stream. In particular embodiments, content that the user may create to upload to the social-networking system 160 may include recorded audio and associated animated faces created using the facial expression modelling and animation methods described below. These presentation methods may help the user create more dynamic and interactive content, which may result in more interest, interaction, and engagement from other users to the content that the user created and uploaded.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
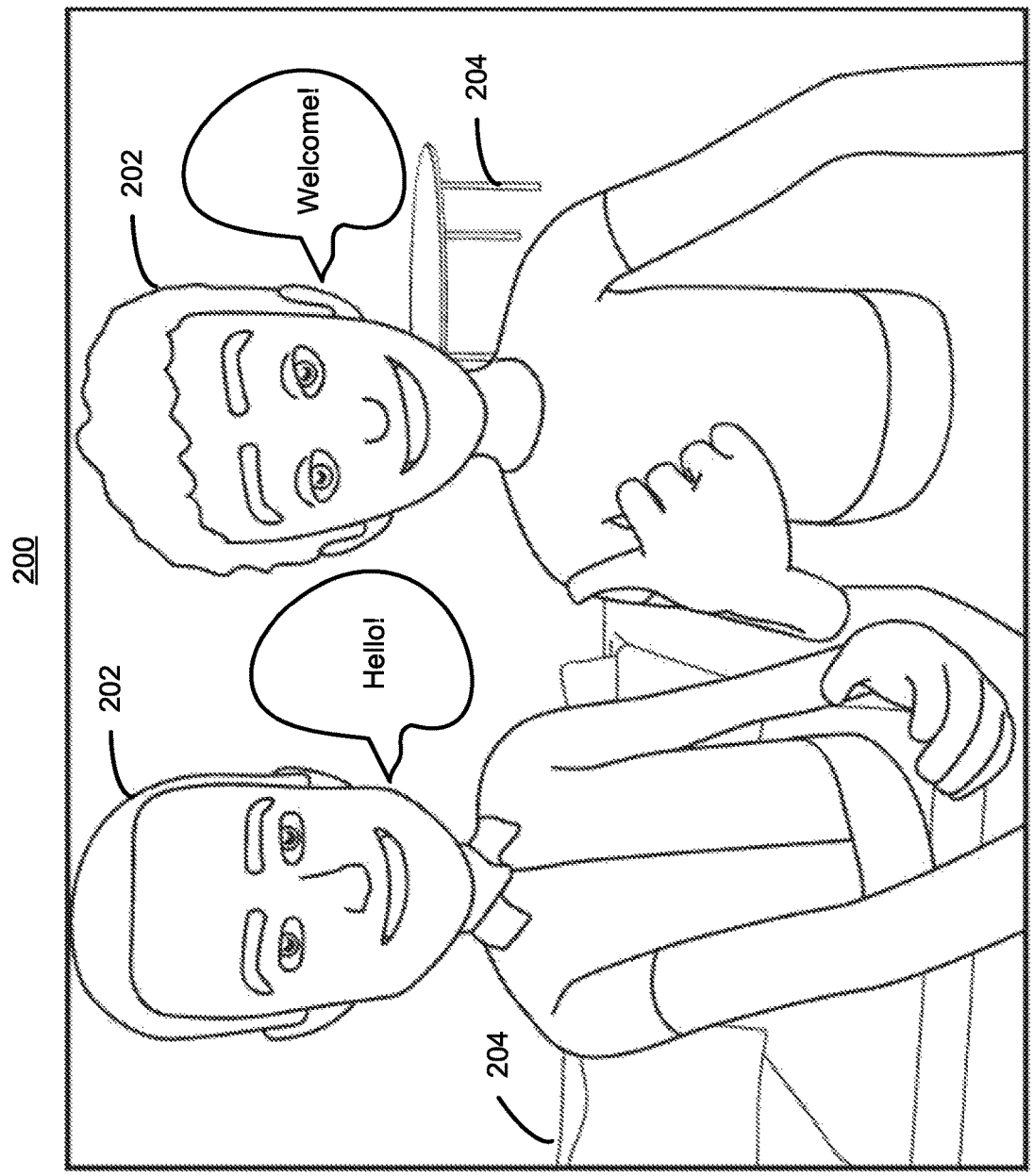
FIG. 2 illustrates an example of a user interacting with various other users in a virtual reality environment.

FIG. 2 illustrates an example of a user interacting with various other users in a virtual reality environment 200. As shown in FIG. 2, one or more users 202 that can interact with the user (not shown) in the virtual reality environment 200, as shown by the "Hello!" and "Welcome!" speech bubbles. As an example and not by way of limitation, this virtual reality environment 200 may be viewed by the user through the virtual reality headset 132. As discussed above, computer based facial expression modelling and animation may be used for presenting animated facial expressions on animated human faces, animal faces, avatar and/or character faces, and other suitable face-like animations. In the example shown in FIG. 2, the facial expression modelling and animation system may be used to create animated faces and/or avatars displayed within the virtual reality environment 200, which may include a virtual space that is rendered for display to the user. The virtual space may include one or more objects 204 (e.g., sofa, chairs, tables, other suitable objects, and any combination thereof) other than users 202. The one or more users 202 may view and interact with each other and with the user (e.g., the user that the one or more users 202 are looking at and talking to in FIG. 2) within this virtual space and the broader virtual environment through any suitable means, such as using animations of themselves or of their avatars to communicate and interact with each other. In particular embodiments, the one or more users 202 may be speaking to the user, and vice versa, and their lips and portions of their faces may be moving to generate an animation of their faces corresponding to words that they are speaking. This animation of the faces to model the movement of the face and lips based on the audio segment of words spoken may be generated by the facial expression modelling and animation system, as discussed in more detail below.

Figure 3:
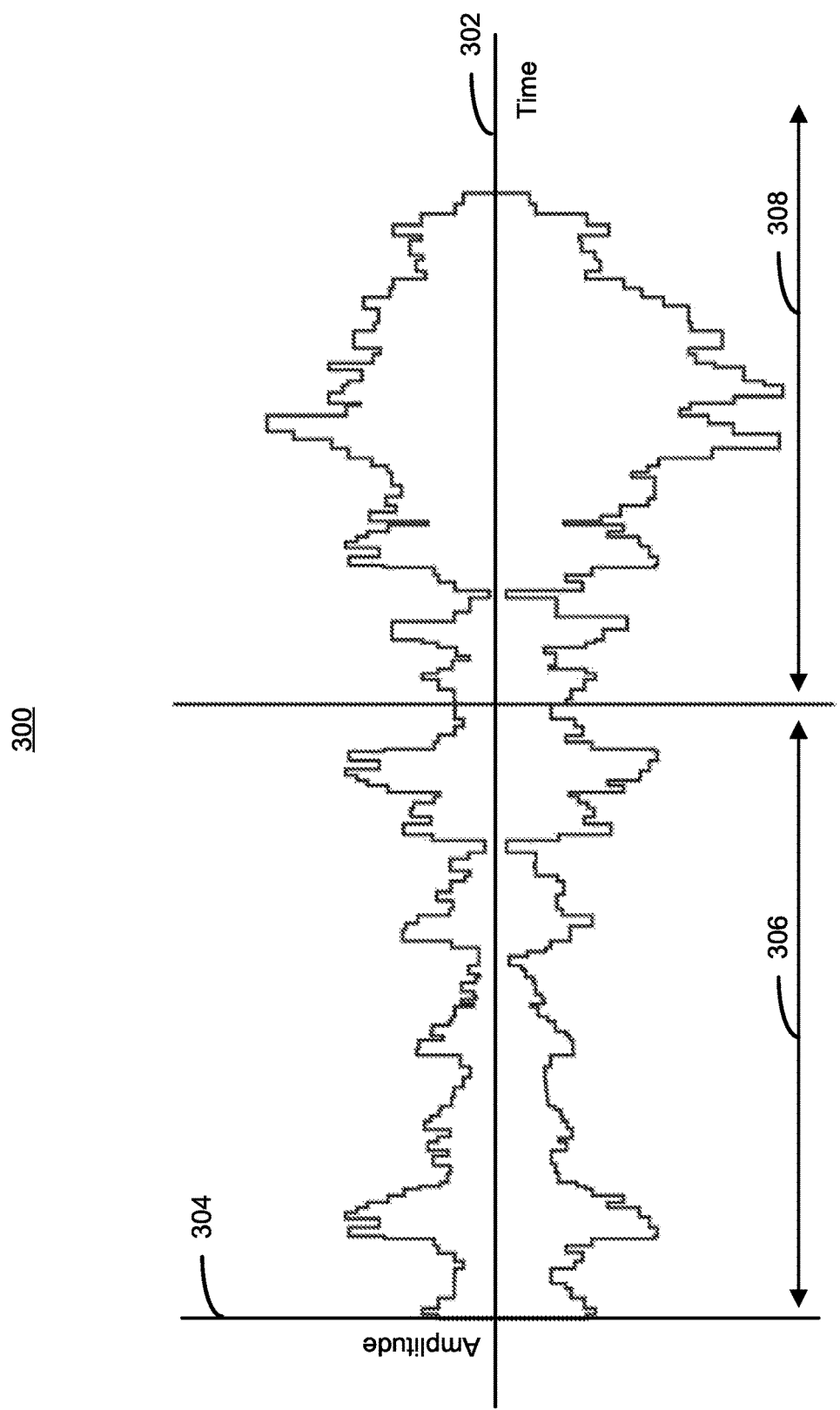
FIG. 3 illustrates an example audio sample.
Figure 4:
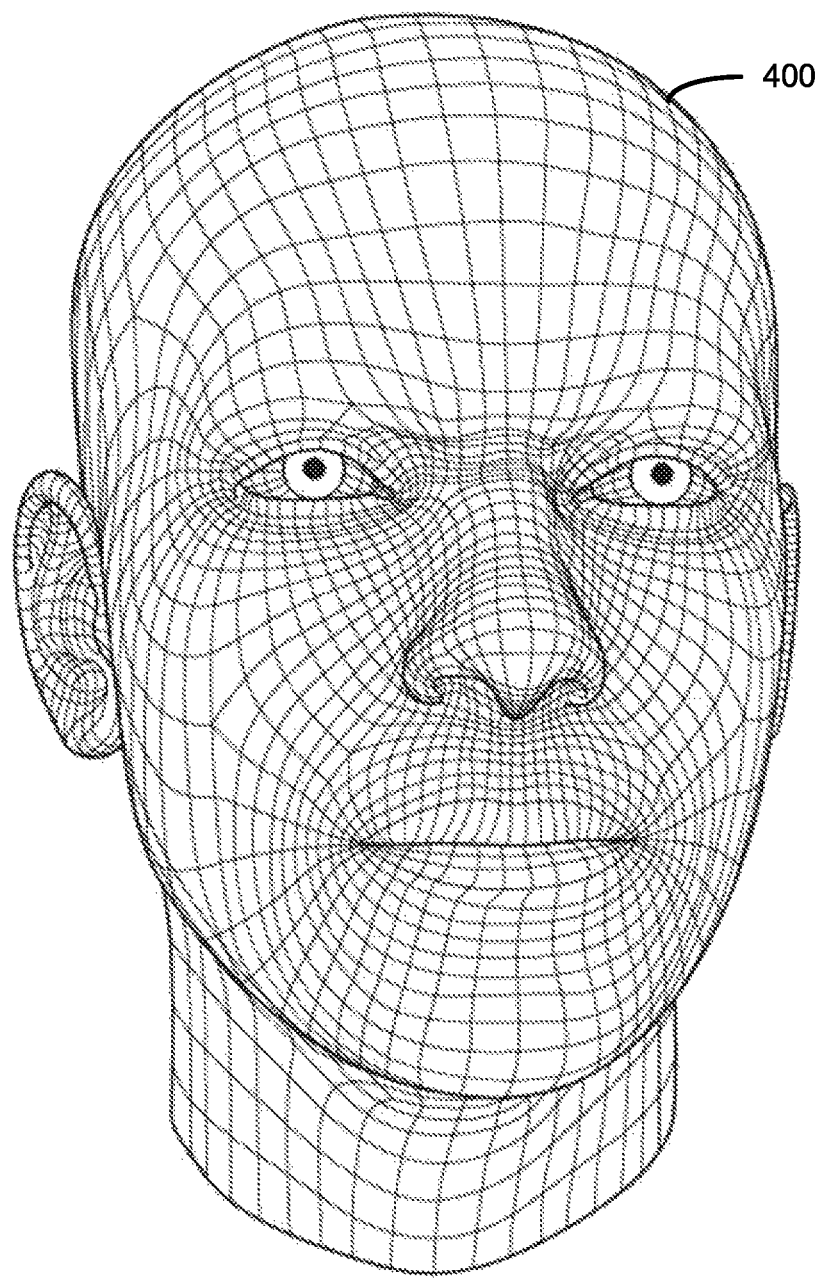
FIG. 4 illustrates a facial mesh model for modeling facial movements.

FIG. 3 illustrates an example audio sample for use in generating the animation of facial movement. FIG. 4 illustrates a facial mesh model for modeling facial movements. FIGS. 5A-5J illustrate example lip movement models for audio syncing. As shown in FIG. 3, an audio sample 300 representative of an audio clip is shown as a discrete time signal converted from a sound wave. Audio sampling and conversation into an audio signal may be completed using existing techniques. The audio sample 300 is displayed on a graph with x-axis 302 corresponding to time and y-axis 304 corresponding to amplitude. Amplitude corresponds to the size of the vibration of each of the segments of the audio signal and may be used to determine how loud a sound is. Frequency corresponds to the speed of the vibration and may be used to determine the pitch of the sound.

Audio sample 300 may be separated into different audio segments to facilitate processing of the audio signals. As shown in FIG. 3, audio sample 300 may be separated into a first audio segment 306 and second audio segment 308, each of which may be 100 milliseconds long. As an example and not by way of limitation, first audio segment 306 containing 100 milliseconds of sound may be further separated into 10 portions of 10 milliseconds that each correspond to one of a plurality of phonemes (e.g., speech units), which are perceptually distinct units of sound in a specified language that distinguish one word from another. Second audio segment 308, also containing 100 milliseconds of sound, may be separated into one portion of 10 milliseconds that also corresponds to a phoneme, in addition to another portion of 90 milliseconds that corresponds to an auditory event such as laughter, sighing, crying, other relevant events, or any combination thereof. Both phonemes and auditory events are discussed in more detail below.

In particular embodiments, video (e.g., hundreds to thousands of hours of video) may be recorded of numerous people speaking and talking in a number of different languages. These recorded videos may then be processed to capture and generate face-tracking data to track lip movement based on time (e.g., based on a time position within the audio file), in addition to movement of various portions of the face including eyebrows, eyelids, cheeks, upper face, forehead, other relevant portions, and any combination thereof, based on time. This face-tracking data may then be correlated to a time position within the audio sample so that it can be tagged with the associated phoneme. In addition, face-tracking data capturing facial movements that occur during the transition between one phoneme to the next phoneme is collected and associated with the particular phoneme-to-phoneme transition.

In particular embodiments, hundreds to thousands of hours of this video are analyzed and processed to collect the face-tracking data for each of the phonemes associated with a particular language, and also to collect the face-tracking data for all of the potential phoneme-to-phoneme transitions associated with the particular language. All of this data may then be inputted into a face-tracking model (e.g., stored in a data such as data store 164, or other suitable data store) that processes the data to generate ground truth facial movements for each of the phonemes and phoneme-to-phoneme transitions, which may be then mapped to a generic facial mesh model 400 for modeling facial movements in real time, as shown in FIG. 4. As an example and not by way of limitation, generic facial mesh model 400 may be used to show the ground truth movements of the lips, eyebrows, eyelids, cheeks, upper face, forehead, other relevant portions, and any combination thereof, for each of the phonemes of the particular language. In addition, generic facial mesh model 400 may be used to show the ground truth movements of the lips, eyebrows, eyelids, cheeks, upper face, forehead, other relevant portions, and any combination thereof, for each of the phoneme-to-phoneme transitions of the particular language. This results in normalized facial movement of the generic facial mesh model 400 based on numerous data points transformed to a set of ground truth reconstructions of the face based on phonemes to enable direct mapping of phonemes to mouth shapes and also intelligent transitioning of the mouth shapes from one phoneme to the next phoneme.

Figure 5C:
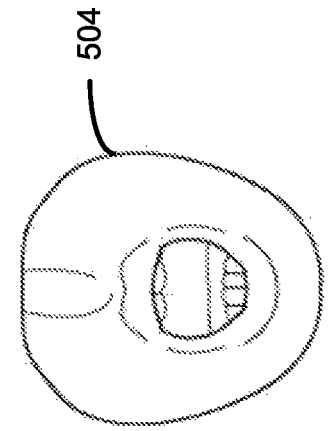
Figure 5B:
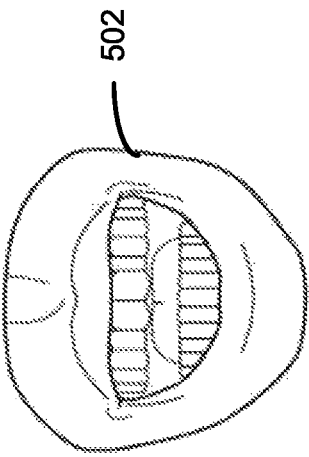
Figure 5A:
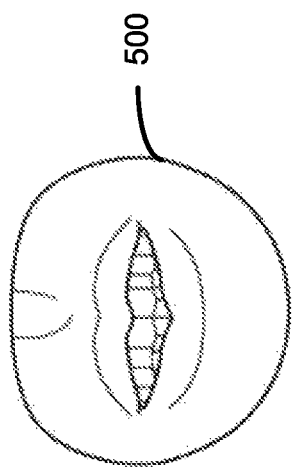
Figure 5E:
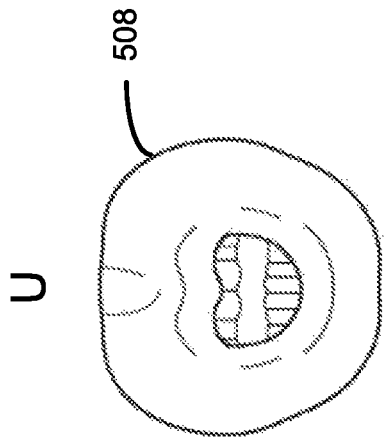
Figure 5D:
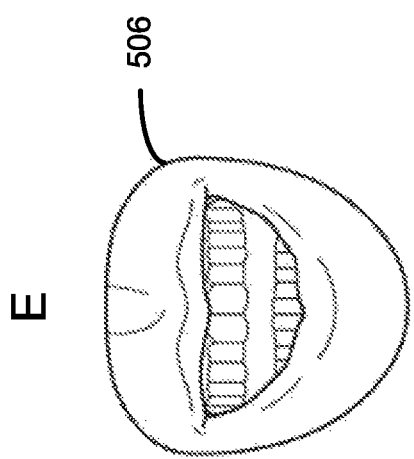

As shown in FIG. 5A-5J, various ground truth lip movements that can be mapped to the generic facial mesh mode 400 may be generated based on the face-tracking data for the English language. As an example and not by way of limitation, FIG. 5A illustrates a ground truth lip position 500 in a resting state (e.g., the person is not talking). FIG. 5B illustrates a ground truth lip position 502 associated with the phoneme "A" or "I," such as when a person says "apple," or "hi," as determined from facial-tracking data. FIG. 5C illustrates a ground truth lip position 504 associated with the phoneme "O," such as when a person says "hello," as determined from facial-tracking data. FIG. 5D illustrates a ground truth lip position 506 associated with the phoneme "E," such as when a person says "enormous," as determined from facial-tracking data. FIG. 5E illustrates a ground truth lip position 508 associated with the phoneme "U," such as when a person says "you," as determined from facial-tracking data. FIG. 5F illustrates a ground truth lip position 510 associated with the phoneme "L," such as when a person says "like," as determined from facial-tracking data. FIG. 5G illustrates a ground truth lip position 512 associated with the phoneme "W" or "Q," such as when a person says "walk" or "quick," as determined from facial-tracking data. FIG. 5H illustrates a ground truth lip position 514 associated with the phoneme "M" or "B" or "P," such as when a person says "mother," "boy," or "parent," as determined from facial-tracking data. FIG. 5I illustrates a ground truth lip position 516 associated with the phoneme "F" or "V," such as when a person says "flavor," or "violet," as determined from facial-tracking data. FIG. 5J illustrates a ground truth lip position 518 associated with the phoneme "E," "T," or "C," such as when a person says "elephant," "tiger," or "cat," as determined from facial-tracking data. As shown above in FIGS. 3, 4, and 5A-5J, since the facial movements of the generic facial mesh model 400 are modeled off tracked facial data, and not merely generic mouth shapes drawn by an artist, the resulting facial movements of the generic facial mesh model 400 are more realistic looking with more realistic-looking mouth movements. In addition, because the phoneme-to-phoneme transitions are also modeled off tracked facial data and can take into account the various micro-expressions that occurring during speech though the movement of the eyebrows, eyelids, upper face, checks, and other portions of the face, the resulting facial movements of the generic facial mesh model 400 are less "wooden" and expressionless, and more alive and realistic looking.

FIGS. 6A-6D illustrate example upper face models for audio syncing. As discussed above, the pitch of the voice in the audio signal (i.e., the degree of highness or lowness of a tone in the voice that depends on the number of vibrations per second produced by the vocal cords) may be correlated to eyebrow height and movement, and also eyelid and cheek movement. In addition, while amplitude corresponds to the size of the vibration of each of the segments of the audio signal and may be used to determine how loud a sound is, frequency corresponds to the speed of the vibration and may be used to determine the pitch of the sound. Since a correlation has been shown between eyebrow height and the pitch of a person's voice, pitch information may be used to drive upper face movement in order to further augment an animated face to look more realistic and natural. In particular embodiments, pitch information of an audio sample (e.g., audio sample 300) may be determined by analyzing the frequency of vibrations of the audio signal for each audio segment, and pitch information, along with any other related signals, may be correlated to facial movements captured in the face-tracking data based on time information.

Figure 6A:
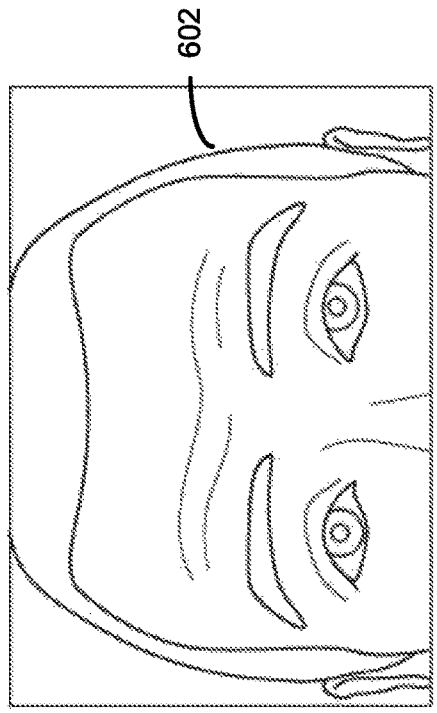
FIGS. 6A-6D illustrate example upper face models for audio syncing.
Figure 6B:
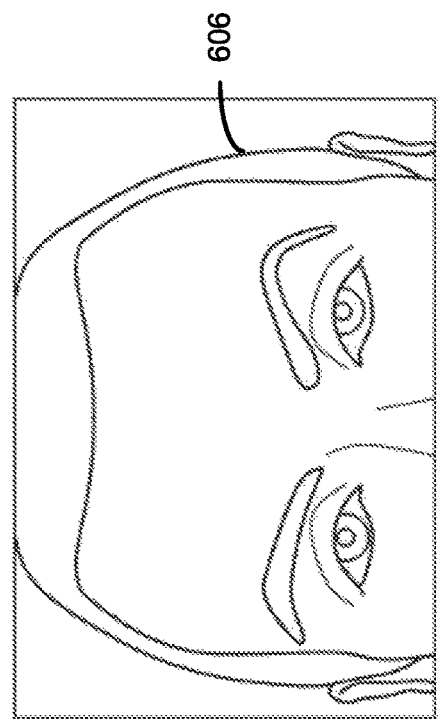
Figure 6C:
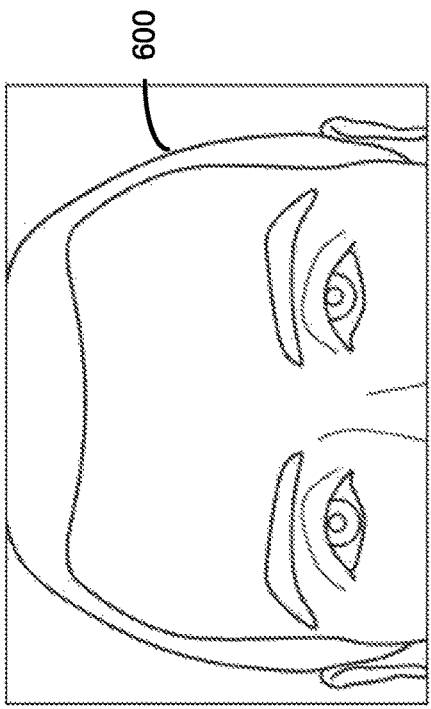
Figure 6D:
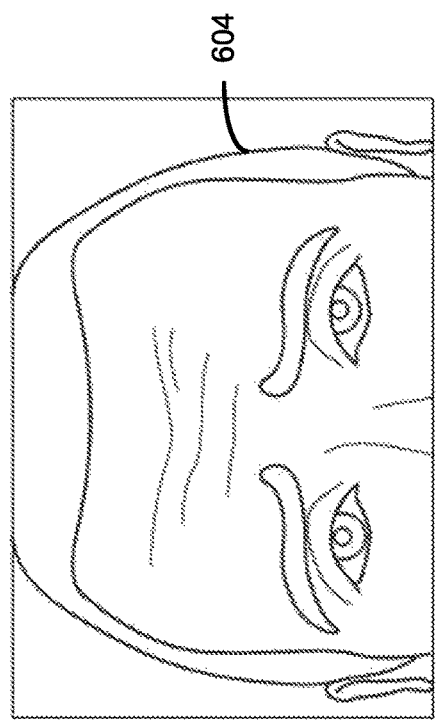

Various ground truth upper face and eyebrow movements that can be mapped to the generic facial mesh mode 400 may be generated based on the face-tracking data and pitch information. In particular embodiments, since pitch is a defining characteristic of a person, a user's "baseline" or "normal" pitch may be determined as an initial step before correlating the pitch information with the ground truth data collected along with the face-tracking data. As an example and not by way of limitation, FIG. 6A illustrates a ground truth eyebrow and upper face position 600 in a resting state (e.g., the person is not talking). FIG. 6B illustrates eyebrow and upper face position 602 in which the eyebrows are at a higher location on the forehead compared to the resting state, which may be associated with a higher pitch of the voice as determined from the audio sample. FIG. 6C illustrates eyebrow and upper face position 604 in which the eyebrows are at a lower location on the forehead compared to the resting state, which may be associated with a lower pitch of the voice as determined from the audio sample. In addition, FIG. 6D illustrates eyebrow and upper face position 606 in which the eyebrows are at different locations relative to each other (e.g., one eyebrow is higher and the other eyebrow is lower) on the forehead compared to the resting state, which may be associated with a higher pitch followed by a lower pitch of the voice, or vice versa, as determined from the audio sample. As discussed above, the facial movement is not limited to eyebrow movement and may include eyelid movement, check movement, forehead movement, and any other relevant upper face movement. As shown in FIGS. 6A-6D, this pitch information and associated eyebrow movement and other face movement may be used with generic facial mesh model 400 to more realistically drive upper face movement using the pitch of the voice and other relevant signals in the audio sample. This results in augmenting the generic facial mesh model 400 using pitch and other relevant information determined from the audio sample.

Figure 7:
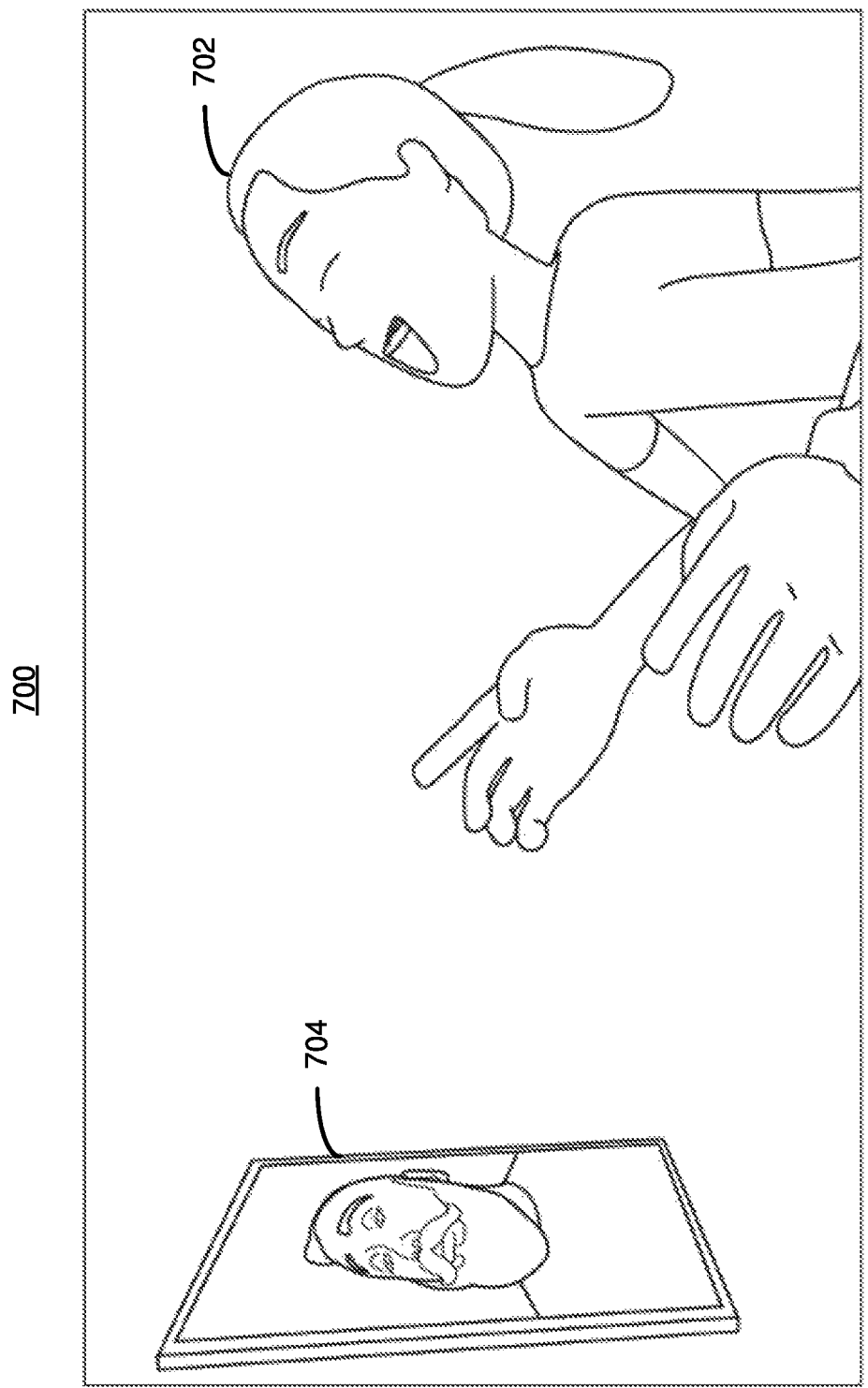
FIG. 7 illustrates an example laughter model for audio syncing.

FIG. 7 illustrates an example laughter model 700 for audio syncing. As discussed above, a laughter event may be detected to animate the face based on a generic animation or tracking and generalizing facial movement based on analysis of the face-tracking data. As an example and not by way of limitation, audio sample 300 includes second audio segment 308 which includes 90 milliseconds that corresponds to an auditory event other than spoken words. This auditory event may be determined to include, for example, laughter, sighing, crying, other relevant events, or any combination thereof. In particular embodiments, this event-detection model may simply detect the occurrence of the auditory event and then replace the facial-movement animation (e.g., including at least the lip-movement animation and eyebrow-movement animation) with an event animation for a predetermined period of time (e.g., the generic facial mesh mode 400 illustrates a laughing animation). In this event-detection model, the animation of the face may be driven based only on an analysis of the audio sample and labeling an event as corresponding to a particular facial animation. Alternatively, the event-detection model may animate the face based on a determination of the type of event (e.g., laughter) and the duration of the event and then mapping the movement to the generic facial mesh mode 400 as determined by the face-tracking data, as discussed above.

In particular embodiments, the laughter animation may depend on the amplitude of the audio to drive the "power" of the laughter, which may then correspond to different animations for different categories of laughter. Example categories may include light chuckling, short laughter, hearty laughter, throwing-head-back loud laughter, or any other suitable category of laughter. As illustrated in FIG. 7, user 702 may be interacting with user 704 in a virtual reality environment, and when user 704 tells a joke, the audio of user 702 may be analyzed to determined that a laughter event has occurred and the facial animation model illustrating user 702 laughing may be displayed. Additional events such as sighing, crying, and other relevant events may also be tracked and portrayed by the facial animation model.

In particular embodiments, the caching of data while processing one segment of audio to the next segment of audio may facilitate faster computations in analyzing the audio samples. As an example, an input of one second of audio data may be processed in 10 millisecond portions. The processing of this audio data may be done in a sliding window fashion such that for every 10 millisecond portion, some of the data collected and already processed for at least the last one millisecond is save and reused so that at least some of the computations relating to the current 10 millisecond portion can be reused to save time and power on processing the 10 millisecond portion. This sliding window processing results in leveraging and reusing previous computations so that the entire audio segment may be processed more quickly. Although this disclosure describes using data caching in a particular manner, this disclosure contemplates using data caching in any suitable manner.

Figure 8:
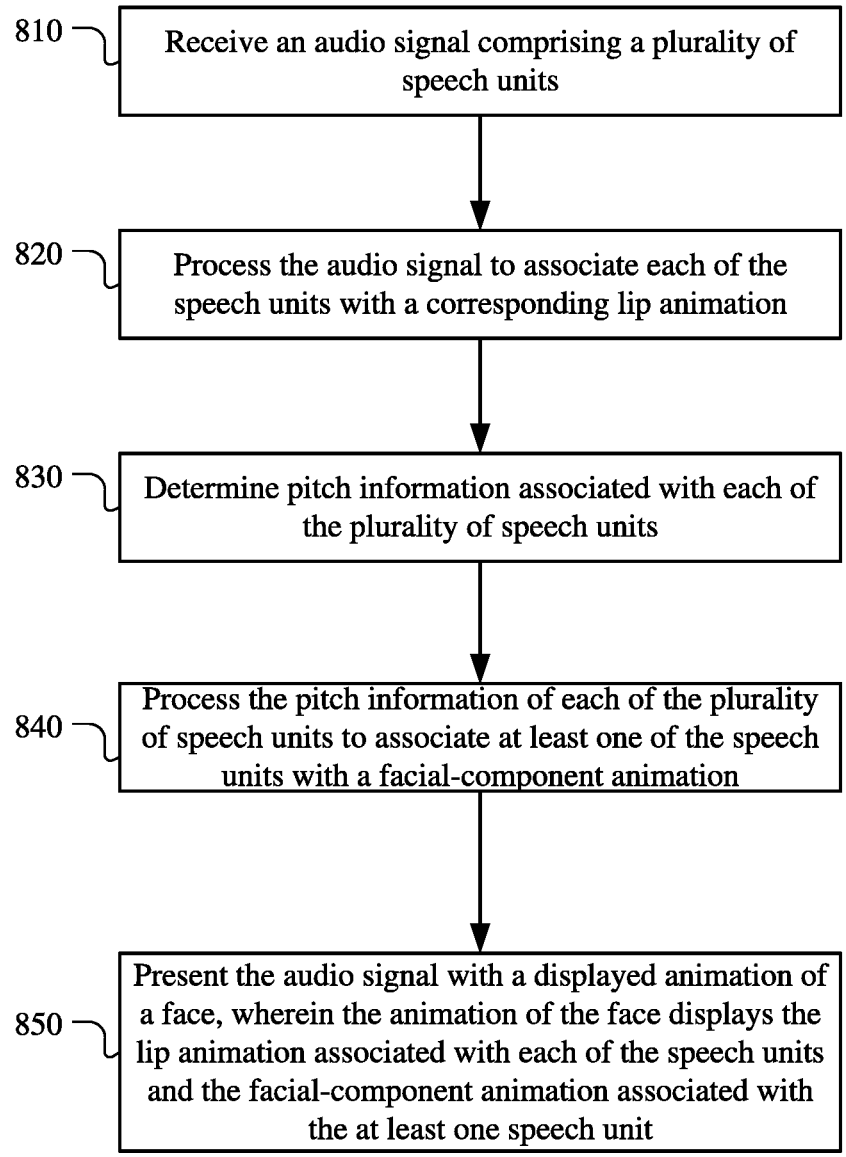
FIG. 8 illustrates an example method for audio-based facial tracking and animation.

FIG. 8 illustrates an example method 800 for audio-based facial tracking and animation. The method may begin at step 810, where a computing device may receive an audio signal comprising a plurality of speech units. At step 820, the computing device may process the audio signal to associate each of the speech units with a corresponding lip animation. At step 830, the computing device may determine pitch information associated with each of the plurality of speech units. At step 840, the computing device may process the pitch information of each of the plurality of speech units to associate at least one of the speech units with a facial-component animation. Then, at step 850, the computing device may present the audio signal with a displayed animation of a face, wherein the animation of the face displays the lip animation associated with each of the speech units and the facial-component animation associated with the at least one speech unit. In particular embodiments, the animation of the face may be displayed in real time with the audio signal. In addition, the method may further comprise, prior to processing the audio signal, accessing, from a database, animation data associated with a plurality of lip movements and facial-component movements. In particular embodiments, the animation data may be created by training animation models based on collected audio and corresponding videotaped facial-component movements.

In particular embodiments, the facial component animation may include animation of a portion of the face other than lips. In particular embodiments, the facial component animation may include animation of eyebrows and eyelids. In particular embodiments, the facial component animation may include movement in eyebrow height, eyebrow movement, and eyelid movement. In particular embodiments, the facial component animation may include animation of the cheeks and upper face. The method may further include processing the audio signal to detect one or more events associated with one or more of the speech units and presenting the audio signal with the animation of the face that displays an event animation corresponding to the one or more speech units. In particular embodiments, the event animation may replace the lip animation and facial component animation associated with the one or more speech units. Moreover, the method may comprise determining an amplitude of the one or more speech units of the audio signal associated with the detected events, wherein movement of the event animation is correlated to the amplitude of the one or more speech units. In particular embodiments, the event animation may include animation illustrative of laughter.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for audio-based facial tracking and animation including the particular steps of the method of FIG. 8, this disclosure contemplates any suitable method for audio-based facial tracking and animation including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
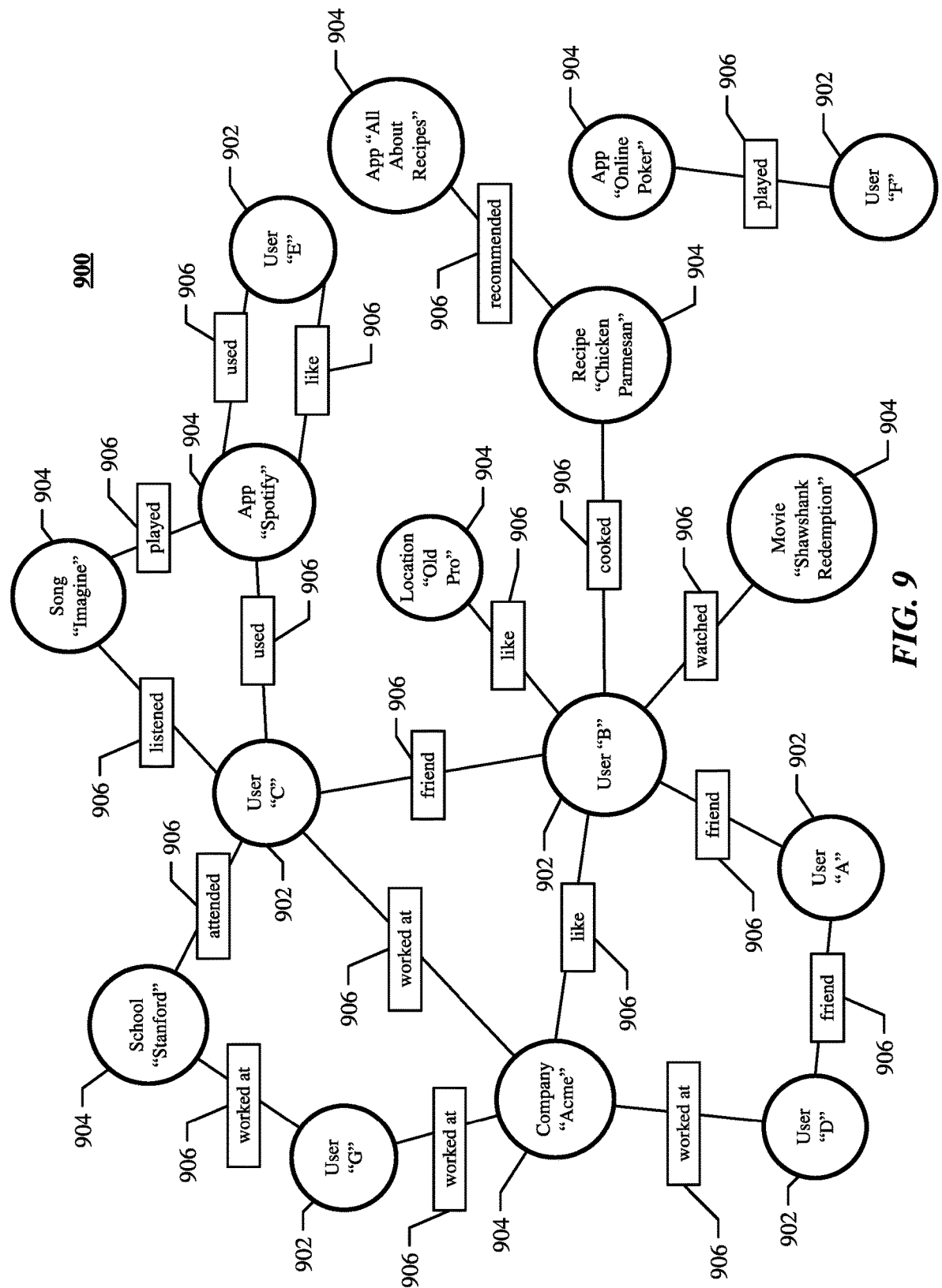
FIG. 9 illustrates an example social graph.

FIG. 9 illustrates example social graph 900. In particular embodiments, social-networking system &60 may store one or more social graphs 900 in one or more data stores. In particular embodiments, social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. Example social graph 900 illustrated in FIG. 9 is shown, for didactic purposes, in a two-dimensional visual map representation. In particular embodiments, a social-networking system &60, client system &30, or third-party system &70 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system &60. As an example and not by way of limitation, a user may be an individual (human user), an entity (e.g., an enterprise, business, or third-party application), or a group (e.g., of individuals or entities) that interacts or communicates with or over social-networking system &60. In particular embodiments, when a user registers for an account with social-networking system &60, social-networking system &60 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system &60. In particular embodiments, a user node 902 may be associated with information provided by a user or information gathered by various systems, including social-networking system &60. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system &60 or a third-party website associated with a web-application server); an entity (such as, for example, a person, business, group, sports team, or celebrity); a resource (such as, for example, an audio file, video file, digital photo, text file, structured document, or application) which may be located within social-networking system &60 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system &60. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system &60. Profile pages may also be hosted on third-party websites associated with a third-party system &70. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system &70. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system &30 to send to social-networking system &60 a message indicating the user's action. In response to the message, social-networking system &60 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system &60 may send a "friend request" to the second user. If the second user confirms the "friend request," social-networking system &60 may create an edge 906 connecting the first user's user node 902 to the second user's user node 902 in social graph 900 and store edge 906 as social-graph information in one or more of data stores &64. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "Acme" and the user node 902 of user "D," and a third path passing through the user nodes 902 and concept nodes 904 representing school "Stanford," user "G," company "Acme," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system &60 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system &60 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system &60 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system &60 may create an edge 906 between a user node 902 and a concept node 904 in social graph 900. As an example and not by way of limitation, a user viewing a concept-profile page (such as, for example, by using a web browser or a special-purpose application hosted by the user's client system &30) may indicate that he or she likes the concept represented by the concept node 904 by clicking or selecting a "Like" icon, which may cause the user's client system &30 to send to social-networking system &60 a message indicating the user's liking of the concept associated with the concept-profile page. In response to the message, social-networking system &60 may create an edge 906 between user node 902 associated with the user and concept node 904, as illustrated by "like" edge 906 between the user and concept node 904. In particular embodiments, social-networking system &60 may store an edge 906 in one or more data stores. In particular embodiments, an edge 906 may be automatically formed by social-networking system &60 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, social-networking system &60 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems &70 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system &60 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system &60 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system &60 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system &60 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system &60 may calculate a coefficient based on a user's actions. Social-networking system &60 may monitor such actions on the online social network, on a third-party system &70, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system &60 may calculate a coefficient based on the user's actions with particular types of content. The content may be associated with the online social network, a third-party system &70, or another suitable system. The content may include users, profile pages, posts, news stories, headlines, instant messages, chat room conversations, emails, advertisements, pictures, video, music, other suitable objects, or any combination thereof. Social-networking system &60 may analyze a user's actions to determine whether one or more of the actions indicate an affinity for subject matter, content, other users, and so forth. As an example and not by way of limitation, if a user frequently posts content related to "coffee" or variants thereof, social-networking system &60 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system &60 may calculate a coefficient based on the type of relationship between particular objects. Referencing the social graph 900, social-networking system &60 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system &60 may determine that the user has a higher coefficient with respect to the first photo than the second photo because having a tagged-in-type relationship with content may be assigned a higher weight and/or rating than having a like-type relationship with content. In particular embodiments, social-networking system &60 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system &60 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system &60 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system &30 of the user). A first user may be more interested in other users or concepts that are closer to the first user. As an example and not by way of limitation, if a user is one mile from an airport and two miles from a gas station, social-networking system &60 may determine that the user has a higher coefficient for the airport than the gas station based on the proximity of the airport to the user.

In particular embodiments, social-networking system &60 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system &60 may provide information that is relevant to user's interests and current circumstances, increasing the likelihood that they will find such information of interest. In particular embodiments, social-networking system &60 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system &60 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system &60 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system &70 (e.g., via an API or other communication channel), or from another suitable system. In response to the request, social-networking system &60 may calculate the coefficient (or access the coefficient information if it has previously been calculated and stored). In particular embodiments, social-networking system &60 may measure an affinity with respect to a particular process. Different processes (both internal and external to the online social network) may request a coefficient for a particular object or set of objects. Social-networking system &60 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 10:
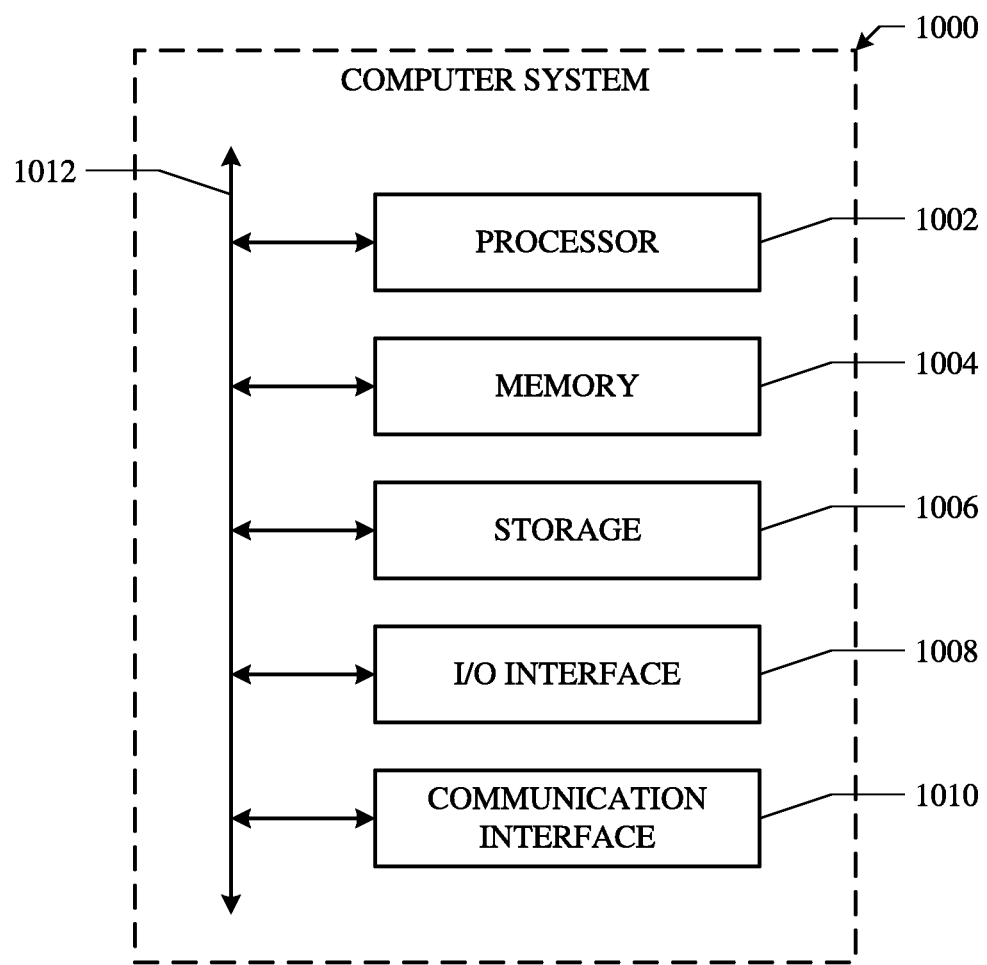
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (MC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, receiving an audio signal comprising a plurality of speech units;
   by the computing device, processing the audio signal to associate each of the speech units with a corresponding lip animation;
   by the computing device, determining pitch information associated with each of the plurality of speech units;
   by the computing device, processing the pitch information of each of the plurality of speech units to associate, without explicit user input, a particular pitch level of a voice in at least one of the speech units with an animation of one or more portions of a face other than lips;
   by the computing device, automatically associating the particular pitch level of the voice with the animation of the one or more portions of the face based on the processed pitch information; and
   by the computing device, presenting the audio signal with a displayed animation of a face, wherein the animation of the face displays the lip animation associated with each of the speech units and the animation of the one or more portions of the face other than lips according to the particular pitch level of the voice in the at least one speech unit.

2. The method of claim 1, wherein the animation of the face is displayed in real time with the audio signal.

3. The method of claim 1, further comprising, prior to processing the audio signal:
by the computing device, accessing, from a database, animation data associated with a plurality of lip movements and facial-component movements.

4. The method of claim 3, wherein the animation data is created by training animation models based on collected audio and corresponding videotaped facial-component movements.

5. The method of claim 1, wherein the animation of the one or more portions of the face other than lips comprises animation of eyebrows or eyelids.

6. The method of claim 1, wherein the animation of the one or more portions of the face other than lips comprises movement in eyebrow height, eyebrow movement, or eyelid movement.

7. The method of claim 1, wherein the animation of the one or more portions of the face other than lips comprises animation of the cheeks or upper face.

8. The method of claim 1, further comprising:
by the computing device, processing the audio signal to detect one or more events associated with one or more of the speech units; and
by the computing device, presenting the audio signal with the animation of the face that displays an event animation corresponding to the one or more speech units.

9. The method of claim 8, wherein the event animation replaces the lip animation and the animation of the one or more portions of the face other than lips associated with the one or more speech units.

10. The method of claim 8, further comprising:
by the computing device, determining an amplitude of the one or more speech units of the audio signal associated with the detected events,
wherein movement of the event animation is correlated to the amplitude of the one or more speech units.

11. The method of claim 8, wherein the event animation comprises animation illustrative of laughter.

12. The method of claim 1, further comprising:
by the computing device, receiving instructions from a user to upload the audio signal with the displayed animation of the face on a social-networking system; and
by the computing device, uploading the audio signal with the displayed animation of the face on the social-networking system.

13. One or more computer-readable non-transitory storage media embodying software that is operable when executed to:
receive an audio signal comprising a plurality of speech units;
process the audio signal to associate each of the speech units with a corresponding lip animation;
determine pitch information associated with each of the plurality of speech units;
process the pitch information of each of the plurality of speech units to associate, without explicit user input, a particular pitch level of a voice in at least one of the speech units with an animation of one or more portions of the face other than lips;
automatically associate the particular pitch level of the voice with the animation of the one or more portions of the face based on the processed pitch information; and
present the audio signal with a displayed animation of a face, wherein the animation of the face displays the lip animation associated with each of the speech units and the animation of the one or more portions of the face other than lips according to the particular pitch level of the voice in the at least one speech unit.

14. The media of claim 13, wherein the animation of the face is displayed in real time with the audio signal.

15. The media of claim 13, wherein the animation of the one or more portions of the face other than lips comprises animation of eyebrows, eyelids, cheeks, or upper face.

16. The media of claim 13, wherein the software is further operable when executed to:
process the audio signal to detect one or more events associated with one or more of the speech units; and
present the audio signal with the animation of the face that displays an event animation corresponding to the one or more speech units.

17. A system comprising:
one or more processors; and
one or more computer-readable non-transitory storage media coupled to one or more of the processors and comprising instructions operable when executed by one or more of the processors to cause the system to:
receive an audio signal comprising a plurality of speech units;
process the audio signal to associate each of the speech units with a corresponding lip animation;
determine pitch information associated with each of the plurality of speech units;
process the pitch information of each of the plurality of speech units to associate without explicit user input, a particular pitch level of a voice in at least one of the speech units with an animation of one or more portions of a face other than lips;
automatically associate the particular pitch level of the voice with the animation of the one or more portions of the face based on the processed pitch information; and
present the audio signal with a displayed animation of a face, wherein the animation of the face displays the lip animation associated with each of the speech units and the animation of the one or more portions of the face other than lips according to the particular pitch level of the voice in the at least one speech unit.

18. The system of claim 17, wherein the animation of the face is displayed in real time with the audio signal.

19. The system of claim 17, wherein the animation of the one or more portions of the face other than lips comprises animation of eyebrows, eyelids, cheeks, or upper face.

20. The system of claim 17, wherein the processors are further operable when executing the instructions to:
process the audio signal to detect one or more events associated with one or more of the speech units; and
present the audio signal with the animation of the face that displays an event animation corresponding to the one or more speech units.

* * * * *